United States Patent [19]

Wesley

[11] Patent Number: 4,517,833

[45] Date of Patent: May 21, 1985

[54] INDUCTIVE ADAPTOR/GENERATOR FOR DIESEL ENGINES

[76] Inventor: William M. Wesley, 21956 North Hickory Hill Dr., Kildeer, Ill.

[21] Appl. No.: 476,692

[22] Filed: Mar. 18, 1983

[51] Int. Cl.[3] .............................................. G01M 15/00

[52] U.S. Cl. .................................... 73/119 A; 324/402

[58] Field of Search ............. 73/119 A, 116; 336/174, 336/175; 324/402

[56] References Cited

U.S. PATENT DOCUMENTS 4,292,841 10/1981 Wesley ............................ 73/119 A 4,334,428 6/1982 Fima et al. ......................... 73/146.5

*Primary Examiner*—Jerry W. Myracle

*Attorney, Agent, or Firm*—Neuman, Williams, Anderson & Olson

[57] ABSTRACT

An adaptor system which includes a transducer for developing a signal from the engine representative of an event to be timed during each combustion cycle of the cylinder being monitored. An input circuit coupled to that transducer processes the transducer output signal and repetitively excites an electromagnetic field generator, typically a multi-turn inductive coil, which is adapted to induce a pulse in the inductive pickup of an associated timing instrument or tachometer.

In one embodiment of the invention the generating coil is excited substantially instantaneously upon the detection of the selected injection or combustion event by the transducer. The combustion event being monitored is preferably the injection of fuel into the fuel line to the number one cylinder by the injection pump.

Alternatively, the event to be monitored may be the instant of combustion, or firing within the cylinder.

To isolate the desired combustion or injection event from the overall transducer output signal, various amplifiers, filters and other signal processing circuits are used. The output of these processing circuits may either drive the field generator coil directly or drive the coil through a delay circuit which is adjustable so as to allow the user to manually adjust the "apparent" timing visible at the engine timing marks without actually adjusting the timing. Actual timing can then be read from the manual adjustment once the "apparent" timing has been reduced to zero degrees. A tachometer is provided in still a further variation of the adaptor.

9 Claims, 4 Drawing Figures

FIG. 1
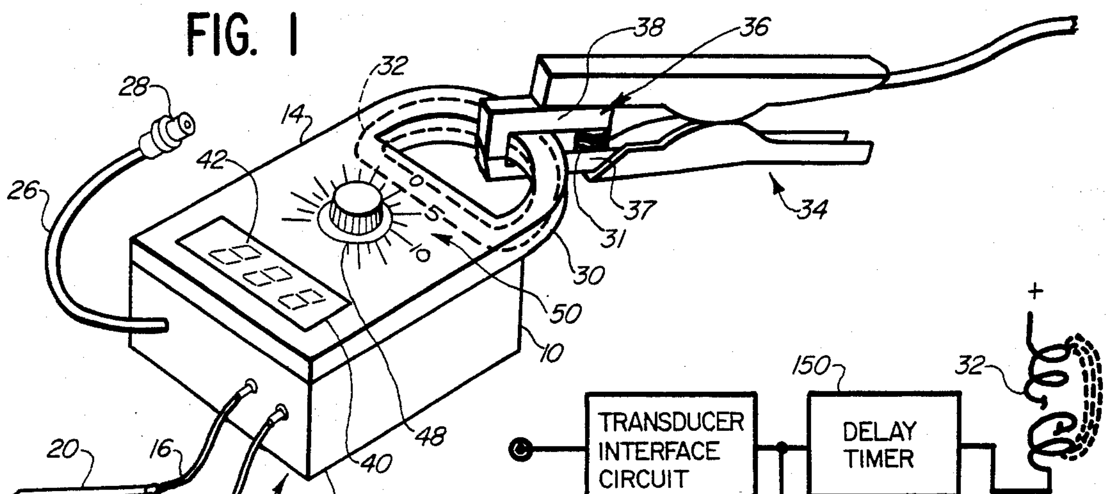
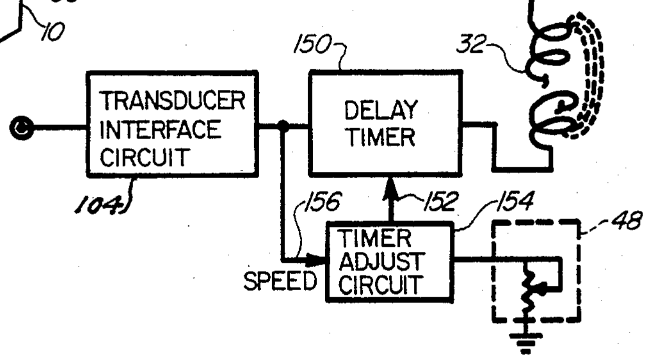
FIG. 4
FIG. 2
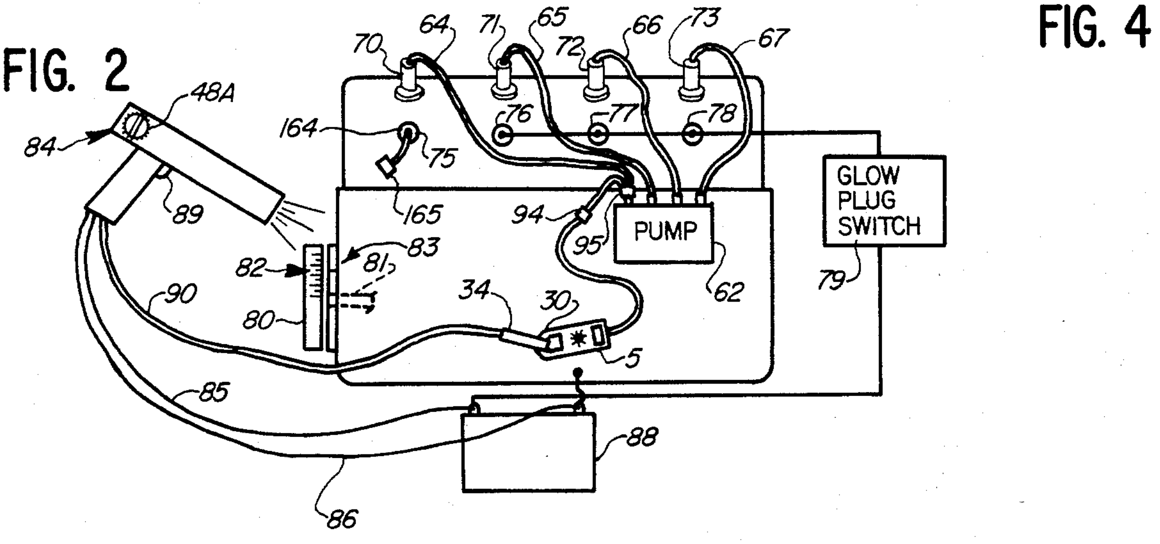
FIG. 3
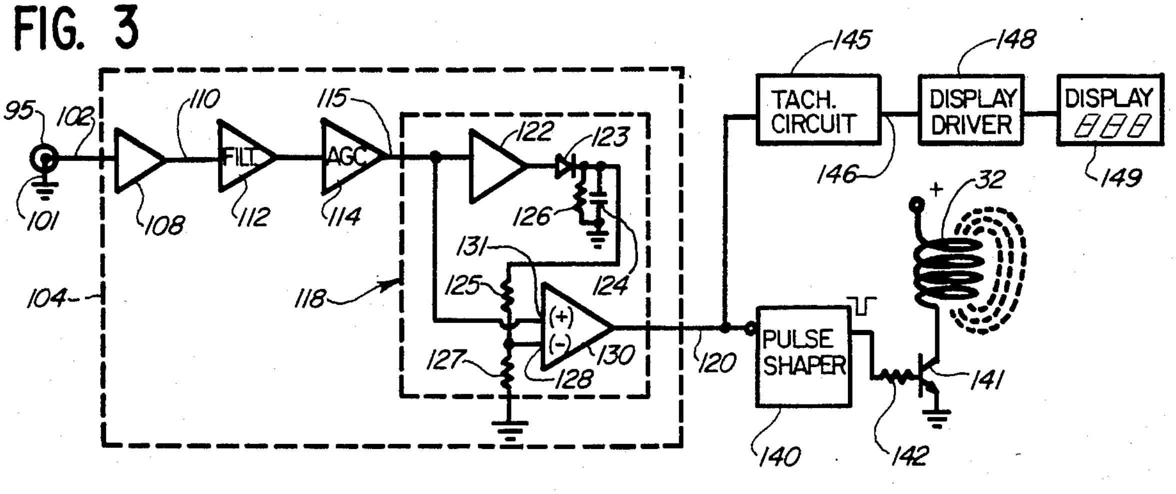

INDUCTIVE ADAPTOR/GENERATOR FOR DIESEL ENGINES

FIELD OF THE INVENTION

This invention is related generally to the field of diesel engine diagnostics, and more particularly to injection and combustion timing in a diesel engine.

BACKGROUND OF THE INVENTION

For many years internal combustion engines of the gasoline type or "carbureted" type have been timed through the detection of an ignition spark delivered to the sparkplug for the number one cylinder. Typically, the instant of spark is detected through the use of an inductive clamp inserted around the sparkplug wire running to the number one cylinder. As the automobile ignition coil, or an equivalent capacitive circuit, discharges its current or voltage to the sparkplug, a sizable current is induced in the sparkplug wire that creates a magnetic field sufficient to allow its detection through the use of any of a variety of inductive coupling devices heretofore known in the art. The most common of such inductive pickup devices utilizes a clamp having two halves separably connected in scissor-fashion to form a doughnut-shaped core around the ignition wire. Once clamped together, the core acts as a current detector, with the ignition wire acting as a generator and the core serving to transform the current or voltage from the ignition wire to a secondary coil which is looped around the core internal to the clamp structure. Various engine diagnostic tasks can be performed with this signal. Most commonly, this signal is used to fire a strobe light of high intensity to illuminate the timing marks on the dynamic damper or other moving elements of the engine on which one or more timing marks are provided. Since a signal is generated in the inductive pickup during each combustion cycle, that signal is also typically used to drive a tachometer circuit and display to indicate engine RPM to the user. Often, both timing and engine speed are derived from the same inductive signal, since the timing specifications for most vehicles are calibrated for specific engine speeds. Induction timing in carbureted engines has become quite popular due to the availability of low cost strobe lights and tachometers for both the skilled mechanic and the general public. As such, the public has been accustomed to this type of timing for many years.

Diesel engines have heretofore been incompatible with conventional induction-type timing equipment and tachometers, for, unlike spark-fired engines, which have readily accessible electrical wires carrying up to 20,000 volts to the sparkplugs, diesel engines have no ignition wires whatsoever. Combustion occurs as a result of pressure within the cylinder and through the proper timing of fuel injection. But while conventional induction timing equipment has heretofore been inapplicable to diesel engine timing, the problem of timing in those engines is as important, if not more important, than timing in a spark-fired engine. If combustion does not occur at the proper time relative to the piston reaching its top-dead-center (TDC) position, then incomplete combustion and/or backfiring can occur. This gives rise to a lack of power, possible damage to internal engine components, decreased engine efficiency and mileage and an increased potential for pollution.

Therefore, timing equipment has been brought to the market by several manufacturers for the purpose of measuring the timing and/or speed of a diesel engine through its injection system. For example, U.S. Pat. No. 4,185,494 assigned to Creative Tool Company discloses a system which provides timing of injection through the use of a transducer coupled to the fuel line at the pump or injection nozzle of a diesel engine. In recent years it has also become popular to time the instant of combustion within the cylinder. A system of this type has been disclosed, for example, in the application of Dooley and Williamson, Ser. No. 357,638 filed Mar. 12, 1982 now U.S. Pat. No. 4,441,360 and in the application of Dooley et al, Ser. No. 351,662, filed Feb. 24, 1982 now U.S. Pat. No. 4,423,624. The signal for timing in that instance is taken from a screw-in piezoelectric device which replaces the conventional glowplug in the number one cylinder for timing purposes.

While the equipment of the foregoing type has been quite effective in providing proper timing for injection and/or combustion in a diesel engine, it has required mechanics and the general public to purchase entirely new instruments dedicated solely to the timing of diesel engines. These instruments have, in general, been complex and somewhat expensive. Moreover, their size has been considerable and has required additional space for their storage. A properly equipped mechanic, in other words, has had to maintain one set of timing equipment for carbureted engines and an entirely different set of equipment for diesel engines.

It is a general object of the present invention to overcome the drawbacks and deficiencies of the prior art. More specifically, it is an object of the present invention to provide timing apparatus utilizing existing timing components and instruments already developed for gasoline engines in the timing of diesel engines.

It is a further object of the invention to provide diesel timing equipment which is simple to use and less expensive to manufacture than timing equipment heretofore made for diesels.

It is another object of the invention to provide an adaptor which allows for the timing of diesel engines with a wide variety of existing timing devices of the inductive type, thus avoiding a duplication of equipment and expense for the mechanic or other members of the public already possessing inductive timing and tachometer equipment.

It is a further object of the invention to provide an adaptor which may provide both timing and RPM simultaneously in a manner heretofore only made possible through existing and far more expensive diesel timing instruments.

It is another object of the invention to provide an adaptor that allows conventional induction timing equipment to be used in conjunction with a variety of signal sources, including both injection-type transducers and combustion-type transducers, with substantially equal facility.

BRIEF SUMMARY OF THE INVENTION

These and other objects and advantages of the invention are achieved through the provision of an adaptor system which includes a transducer for developing a signal from the engine representative of an event to be timed during each combustion cycle of the cylinder being monitored. An input circuit coupled to that transducer processes the transducer output signal and repetitively excites an electromagnetic field generator, typically a multi-turn inductive coil, which is adapted to induce a pulse in the inductive pickup of an associated timing instrument or tachometer.

In one embodiment of the invention the generating coil is excited substantially instantaneously upon the detection of the selected injection or combustion event by the transducer. The combustion event being monitored is preferably the injection of fuel into the fuel line to the number one cylinder by the injection pump. In a properly functioning diesel, this event may occur at from 2° to 20° in advance of the piston reaching its top-dead-center position. This event is monitored through the use of piezoelectric transducers of the type shown in U.S. Pat. No. 4,109,518 of Creative Tool Company.

Alternatively, the event to be monitored may be the instant of combustion, or firing within the cylinder, an event which may be detected through the use of any of a variety of cylinder pressure transducers, including those made by Creative Tool and disclosed in U.S. Pat. Nos. 4,036,050, 4,227,403 and 4,227,402.

To isolate the desired combustion or injection event from the overall transducer output signal, various amplifiers, filters and other signal processing circuits are used. The output of these processing circuits may either drive the field generator coil directly or drive the coil through a delay circuit which is adjustable so as to allow the user to manually adjust the "apparent" timing visible at the engine timing marks without actually adjusting the timing. Actual timing can then be read from the manual adjustment once the "apparent" timing has been reduced to zero degrees.

In another form of the invention, the adaptor/generator includes a tachometer circuit and associated readout means so as to allow the user to read engine RPM without the need for an additional tachometer. Of course, the use of an integrated tachometer is optional, since the adaptor/generator by itself facilitates the use of a wide variety of existing inductive-type diagnostic instruments for which the tachometer function is already built-in.

The objects and advantages of the invention will become apparent upon reading the following detailed description and upon reference to the drawings.

DESCRIPTION OF THE DRAWINGS

In the drawings:

FIG. 1 is a perspective view of an adaptor/generator constructed in accordance with the present invention.

FIG. 2 is a side elevation view of an internal combustion engine, battery and timing apparatus incorporating the adaptor/generator of the present invention.

FIG. 3 is a block diagram illustrating one embodiment of the adaptor/generator of the present invention.

FIG. 4 is a block diagram illustrating a second embodiment of the present invention.

While the invention will be described in connection with certain illustrated embodiments, it should be understood that the invention is not intended to be limited to those embodiments but rather is intended to cover all alternatives, modifications and equivalents that may be within the spirit and scope of the invention as defined by the appended claims.

DETAILED DESCRIPTION OF THE PREFERRED EMBODIMENTS

Turning now to the drawings, FIG. 1 shows a perspective view of an adaptor/generator 5 constructed in accordance with the present invention. The adaptor/generator, in general, is comprised of an external housing 10, typically consisting of a lower box-like structure 12 having a hollow cavity formed therein for housing the circuit components described below, and an upper cover 14. Power for the adaptor/generator may be provided from a variety of sources, including an internal battery, or from a pair of leads 16, 18 having connectors 20, 22 thereon adapted for connection to the terminals of the vehicle battery.

In accordance with the present invention means are provided for receiving a signal from the transducer, for monitoring combustion events within the engine and for generating a change in electrical field strength in response to the signal from the transducer. To this end, the adaptor/generator shown in FIG. 1 includes an input cable 26, typically of the coaxial type, having a connector 28 adapted for coupling to a mating connector (FIG. 2) from any one of a variety of engine transducers to be discussed below. After processing by the adaptor/generator circuitry, the transducer signal activates a field concentrator in the form of an extended loop 30 which extends from the distal end of the cover portion 14 of the housing 10. While the field concentrator may take any of a variety of different forms within the spirit and scope of the invention, the preferred embodiment is an open loop 30 housing a multi-turn inductive coil 32 shown in phantom by dotted lines in FIG. 1. The necessary field may be generated through the use of a single wire carrying a very high current surge, since conventional inductive pickups are designed to respond to such a high current surge in the ignition wire in the spark-fired engine. However, in spark-fired engines the ignition pulse is created by the collapse of a field in the ignition coil, which results in the generation of a voltage amounting to hundreds and sometimes thousands of volts across the sparkplug gap. The inductive pickups used on most timing and tachometer apparatus detect this surge of high current created by the ignition coil of a spark-fired engine by surrounding the ignition wire with a doughnut-shaped core of ferrite material. Such an inductive pickup is shown in FIG. 1, wherein a clamp-type inductive pickup is depicted at 34. The housing is of two-piece construction and encompasses a doughnut-shaped ferrite core 36 having a first portion 37 in the lower half of the clamp 34 and a C-shaped second portion 38 in the upper portion of the clamp. The two halves of the clamp are held together by suitable springs to provide a scissors-type action in any of a variety of ways. The opening defined by the C-shaped portion of the core is typically large enough to encompass a wide variety of ignition wires and may, for example, enclose an area approximately ½ inch square. Thus configured, the clamp device is well adapted to intercept a significant portion of the electromagnetic field generated around a conventional ignition wire. Since conventional ignition wires are hearvily insulated to prevent arcing and danger from the substantial voltages being generated by the ignition coil, the inductive-type pickups such as that shown in FIG. 1 contain an opening large enough to encompass both the conductor and its associated insulation.

In the preferred embodiment of the invention shown in FIG. 1, advantage is taken of the fact that inductive clamps provide a substantial opening for ignition wires, and the extended loop 30 of the adaptor/generator encompasses a conductor which is coiled into multiple turns, the number of turns typically being between 5 and one hundred, the number being variable over a wide range. The use of multiple turns and formation of those turns into a coiled bundle provide a number of advantages over the use of a single inductor or antenna driven by high voltage. First, the use of multiple turns multiplys the effective field strength of the inductor in a manner well-known in the art, thus reducing the voltage and current that must be applied to the conductor in order to induce a substantial voltage in the inductive-type pickup. Second, since the current requirement is greatly reduced through the use of multiple turns, the gauge of the wire used in the coil can be substantially reduced. This, in turn, allows for a greater number of turns to be incorporated into the coil with an attendant increase in field strength. Of course, the toroidal shape of the coil, as is well-known in the art, concentrates the energy from the entire conductor length within the hole-shaped area defined by the coil, thus facilitating detection of the field through use of the detector core 36 of the inductive clamp 34.

The generator coil 32 is preferably housed within the extended portion or loop 30 of the cover 14 for the adaptor housing 10. This construction can be facilitated in a number of ways. First, the housing 10 may be vacuum formed or molded to create a recess within the extended portion 30 of the cover 14 into which the coil may be placed. Alternatively, the cover 14 of the housing 10 may be molded as a one-piece unit with the coil 32 fixed in place during the molding process. The coil may also be potted, molded or loosely insulated as a separate unit and thereafter affixed to the housing 10 with screws, adhesive or the like. The coil 32 is typically constructed of thin insulated transformer wire wound in a manner known to those skilled in the art. Molding of the coil into a suitable dielectric material protects the fragile strands of transformer wire from wear and damage normally associated with the use of tools by mechanics or the like.

While the circuit for driving the coil from the transducer output signal will be described more fully below in connection with other figures, it is noted here that the adaptor/generator 5 shown in FIG. 1 incorporates two features which, in combination with the basic adaptor circuit, constitute additional embodiments of the present invention. First, for the purpose of providing a display of engine RPM to the person using the adaptor/generator 5, the housing 10 has an aperture 40 formed in the upper cover thereof through which a display 42, typically of the digital type, may be viewed. This display may be used for monitoring RPM, or, in the alternative, it may be associated with appropriate circuits to display a manually adjustable timing delay to be discussed more fully below.

In addition, the housing 10 has on the upper cover 14 thereof a manually adjustable dial 48 which is provided for the purpose of manually adding a delay factor to the production of the output field in the coil 32 for purposes to be discussed below. Suitable calibration marks and numbers 50 are provided on the face of the cover 14 and act in conjunction with a pointer or indicator on the edge of the adjustable control 48 to advise the operator as to the number of degrees of crankshaft rotation by which the production of the electromagnetic output field has been delayed.

The operation of the adaptor/generator of the present invention may be more readily understood by reference to FIG. 2, wherein there is shown an internal combustion engine 60 having a fuel injection system comprised of an injector pump 62 and a plurality of fuel injection lines 64, 65, 66 and 67 extending from the pump 62. The fuel injection lines 64–67 terminate at injector nozzles 70, 71, 72 and 73 respectively. The timing of injection into each of the lines 64–67 is controlled through linkage (not shown) driven by the engine. The injector nozzles extend into the cylinder either directly or via a pre-combustion chamber in a manner well-known to those skilled in the art. Also extending into each of the cylinders is a glow-plug, depicted at 75, 76, 77 and 78 respectively. The glow-plugs are typically provided for the purpose of pre-heating the precombustion chamber electrically from the battery of the automobile upon the activation of a switch 79 by the operator. Extending out of the engine on one or both ends thereof is a flywheel, dynamic damper, or pulley assembly 80 which is driven by the engine crankshaft via a suitable shaft extension 81. The rotary element 80 may be any of a variety of components within the engine compartment that are driven directly by the crankshaft or indirectly from the crankshaft and upon which timing marks 82 are located to allow one to monitor the relative position of a selected piston in relation to its top-dead-center position. Typically, the timing marks 82 are provided on the engine dynamic damper and cooperate with a fixed indicator or mark 83 on the block or bell housing of the engine. In conventional timing apparatus for carbureted engines, these timing marks can be monitored with a stroboscopic light activated from the ignition wires in a manner well-known to those skilled in the art.

In accordance with the present invention, a stroboscopic timing light 84 is provided for illumination of the timing marks 82, 83 on the engine and on its rotary component 80. The timing light 84 is powered by a pair of leads 85, 86, typically connected to the 12-volt battery 88. A trigger 89 is provided on the light to allow the operator to control the period of operation. The primary timing input to the timing light 82 is provided on a cable 90, the distal end of which is coupled into an inductive-type pickup such as the pickup 34 shown in FIG. 1. The adaptor/generator 34 shown in FIG. 2 is depicted with its loop portion 30 secured within the inductive-pickup 34 of the timing light. The input cable for the adaptor/generator is coupled through a suitable connector 94, typically of the BNC type, to transducer 95. The transducer 95 which is coupled to the adaptor/generator in this instance is a nut-shaped fuel line transducer of the type disclosed in U.S. Pat. No. 4,109,518, the disclosure of which is incorporated herein by reference. In this instance, the adaptor/generator 5 is shown without separate power leads to indicate that the generator may be powered by its own internal batteries, since the small power requirements of the unit make the invention entirely portable and self-sufficient.

One embodiment of the internal circuit for the adaptor/generator 5 is shown in FIG. 3. As therein depicted, the transducer 95 typically produces its output signal between a ground lead 101 and a primary output lead 102. For the purpose of detecting a selected injection or combustion event from the transducer output signal, a Transducer Interface Circuit 104 is provided. The circuit 104 includes one or more signal processing circuits functionally shown in FIG. 3. As shown, these circuits include a first amplifier 108 which acts as an isolation amplifier and provides a very high impedance, typically on the order of megohms, to allow the transducer to produce its output signal without significant electrical loading. The output of the isolation amplifier 108 is coupled via a connection 110 to a filtering amplifier 112 which may have any of a variety of band pass characteristics. When used in conjunction with the nut-shaped transducer shown in U.S. Pat. No. 4,109,518, the filtering amplifier 112 typically has a frequency response such that high frequency components are attenuated, while lower frequency signals, including the primary pulses created when injection into the fuel line occurs, are passed. Filtering in this manner eliminates much of the noise typically found in transducers connected to internal combustion engines.

The filtering amplifier 112 may have other band pass characteristics when used with other transducers, as will be discussed more fully below.

The output of the filtering amplifier 112 is shown connected to an AGC amplifier 114 which is provided for the purpose of developing a signal of relatively uniform amplitude from the wide variety of different signal amplitudes developed by the transducer 95 during its normal operation. The AGC amplifier 114 may incorporate any of a variety of circuits commonly known for developing automatic gain control. The AGC amplifier 114 produces an output 115 which is coupled to a circuit 118 which acts as an adaptive threshold detector. The circuit 118 is more fully disclosed and described in U.S. Pat. No. 4,185,494 of Creative Tool Company, the disclosure of which is incorporated by reference. Its function is to pass through to an output line 120 those portions of the transducer signal which exceed a predetermined percentage of the average peak amplitude of the transducer signal. In this manner, extraneous noise which may pass through the filter amplifier 112 is attenuated so as to allow the primary output pulse from the transducer to pass.

The adaptive threshold detector 118 consists of a peak detector section having an operational amplifier 122, the output of which is coupled through a diode 123 to a capacitor 124 connected to ground. A resistor 126 acts as a slow discharge path for the peak detector. Also connected to the output of the peak detector is a voltage dividing network consisting of resistors 125 and 127, the junction of which is connected to the inverting input 128 of a comparator amplifier 130. The non-inverting input 131 of the amplifier 130 receives the input signal to the adaptive threshold detector from the AGC amplifier 114. The resistors 125 and 127 are chosen such that the comparator amplifier 130 passes only those signals from the AGC amplifier 115 which exceed a predetermined percentage, typically 75%, of the average peak value detected by the peak detecting circuit consisting of elements 122, 123, 124 and 126. In this manner, most of the possible noise and other extraneous signals other than the primary transducer injection pulses are blocked.

The output of the threshold detector circuit 118 may, in certain instances, be coupled directly to the field generating coil 32. More typically, however, an intermediate pulse shaper circuit 140 is provided so as to make the output of the pulse from the interface circuit a fixed duration pulse capable of discharging the field generating coil 32 for the same period of time during each cycle of the engine. In the configuration shown, the pulse shaper is also an inverter and its output pulse is negative-going so as to turn off a transistor switch 141 through a coupling resistor 142 at the base thereof. The coil 32 is normally conducting current through a resistor 143 in series circuit with the collector-emitter circuit of the transistor 141 across the supply voltage.

Since an inductive coil produces its maximum flux change upon collapse of its field, the coil 32 is preferably maintained in a normally conductive state. In other words, during the period between pulses from the transducer, the coil is supplied with current through the transistor 141. Upon occurrence of the primary transducer output pulse, the pulse shaper 140 cuts off current to the coil 30, allowing the field created within the coil to collapse instantaneously. This, in turn, induces a substantial magnetic field, or flux change in the inductive core of the pickup clamp 34 (FIG. 1) which results in a voltage across the internal winding 31 of the pickup sufficient to energize the associated instrumentation.

It should be noted that the inductive pickups and associated instrumentation are generally polarity sensitive. That is, they respond to a change of field in the coil 32 in one direction only. Therefore, the extended portion 30 of the cover plate 14 (FIG. 1) is appropriately marked with an arrow or other indicia (not shown) to allow the user to identify the proper manner in which the clamp 34 should be applied.

When power dissipation is a concern, the pulse shaper 140 may be a non-inverting type with an output pulsewidth controlled to be 20 microseconds or less. While this introduces a slight delay of less than one half degree in driving the timing light, the resulting timing deviation is insignificant and well within the bounds of normal timing deviation.

An optional tachometer function is also illustrated in the functional block diagram of FIG. 3, wherein the output from the adaptive threshold detector circuit 118 is coupled to a circuit 145 designated TACH CIRCUIT. The TACH CIRCUIT 145 may be any of a variety of circuits well-known in the art for developing a speed related signal from spaced, repetitive pulses representing crankshaft rotation. The TACH CIRCUIT 145 provides an output 146 which is coupled to a driver circuit 148 and thereafter to a suitable display 149. The display 149 may be of a digital type providing an alphanumeric display such as the display 42 shown in FIG. 1. Alternately, the display 149 may be an analog meter in which case the TACH CIRCUIT 145, driver 148 and display 149 may be integrated in a single modular unit.

FIG. 4 depicts still a further embodiment of the invention, wherein the energization of the field generating coil 32 is delayed by a number of degrees of crankshaft rotation which is controllable by the operator from the manual control 48 (FIG 1). This feature is particularly useful for measuring the timing in engines which have only one timing mark for the top-dead-center position, or for engines in which the numbers on the flywheel timing marks are difficult to read. By delaying the energization of the coil 32 by a controlled amount, the timing marks at the engine rotational element can be aligned so that the apparent timing viewable on the marks is zero degrees. The actual timing can then be monitored from the adjustment that has been made to achieve the apparent zero degree condition. To this end, the transducer interface circuit 104 provides its output pulse to a timer circuit 150 designated DELAY TIMER. The DELAY TIMER is typically a type 555 timer which is well-known to those skilled in the art. The period of the time delay achieved by the timer 150 is controllable externally through an input 152 of the timer. If the time delay is to be monitored in real time, the delay control 48 may be used to directly adjust a voltage at the input 152 for the timer 150. However, a more meaningful timer adjustment is achieved if the delay control is calibrated in degrees of crankshaft rotation. To achive timing in this manner, a timer adjustment circuit 154 is provided which tailors the input from the delay control as a function of a speed-related signal provided at an input 156 to the timer adjust circuit 154.

The delay timer circuit 150 and timer adjustment circuit 154 are known to those skilled in the art and may be of the type found in various commercial timing lights having adjustable delays.

While the delay adjustment 48 and display 42 are shown as part of the adaptor/generator 5 in FIG. 1, they need not be a part of the adaptor/generator itself. Numerous timing lights now on the market incorporate such features within the light housing itself. By way of illustration, therefore, the system shown in FIG. 2 employs a timing light having a delay control adjustment 48A on the outer housing. For this configuration, the DELAY TIMER 150 and TIMER ADJUST CIRCUIT 154 are housed within the timing light itself, rather than in the adaptor/generator. In fact, it is an important feature of the invention to provide an adapter which allows the use of such adjustable delay timing lights with diesel engines. As another variation of the diagnostic system of the present invention, the adaptor/generator may be used with timing lights in which the tachometer function is also built into the light.

As thus far described, the adaptor/generator has been depicted in association with a split-nut transducer of the type disclosed in U.S. Pat. No. 4,109,518, the disclosure of which is incorporated herein by reference. As noted above, transducers of this type generate an output pulse upon the occurrence of injection of the line from the pump output to the No. 1 cylinder. As an alternative embodiment, the split-nut transducer may be employed at the nozzle end of the injection line, so as to provide an indication in degrees of crankshaft rotation of the arrival of fuel at the nozzle. The adaptor/generator may also be used with various in-line and clamp-type transducers presently available for developing signals from the injection fuel lines.

While the timing of injection is a major application for which the apparatus of the present invention is intended, timing of combustion within the cylinder itself is also possible with this equipment. To this end, the embodiment of FIG. 2 shows an alternate form of transducer in the form of a glow-plug replacement transducer of the type disclosed in U.S. Pat. No. 4,227,402, a transducer of the type shown in U.S. Pat. No. 4,227,403 of Creative Tool, or any of a variety of injector nozzle transducers disclosed in U.S. Pat. No. 4,036,050 of Creative Tool. Each of these transducers develops a signal which varies in accordance with changes in pressure within the cylinder itself. The output of these transducers include a sharp spike which occurs on the normal cylinder pressure curve at the time of combustion within the cylinder. This sharp spike has a high frequency characteristic which can be detected through appropriate filtering in the manner set forth in the copending application of Dooley and Williamson, Ser. No. 357,638 filed Mar. 12, 1982, and in Dooley et al application Ser. No. 351,662 filed Feb. 24, 1982 the disclosures of which is incorporated herein by reference. When used with transducers of this type, the interface circuit 110 is preferably comprised of the differentiating and level control circuits 51, amplifier 52, high pass filter 53 and adaptor threshold detector 48 shown in FIGS. 2 and 5 of the aforesaid application Ser. No. 357,638. The glow-plug replacement transducer is shown in FIG. 6 of that application and is illustrated as element 164 in FIG. 2 of the drawings of this application. Transducers of this type have a BNC-type connector 165 coupled thereto which is connectable by coaxial cable to the adaptor/generator input circuit.

From the foregoing it should be apparent that there has been brought to the art in the present invention a versatile adaptor/generator which makes possible a variety of diagnostic systems heretofore unavailable for diesel engines. The adaptor/generator itself may take several forms providing different but related functions, including the direct energization of an inductive instrument such as a timing light or the like, in response to any of a variety of predetermined injection or combustion events. Alternatively, the adaptor/generator may include means for delaying the energization of the induction/triggered instrument by an adjustable amount selected by the operator. The adaptor/generator may also incorporate any of a variety of tachometers to provide the operator with a display of engine speed.

Moreover, the adaptor/generator may be used with any of a variety of transducers for monitoring various combustion events occurring within a chosen cylinder, including the initiation of fuel injection from the pump, the receipt of fuel injection by the injector nozzle and the initiation of actual combustion within the cylinder.

Finally, the adaptor/generator of the present invention may be combined with any of a variety of different timing lights heretofore useful only on internal combustion engines, including timing lights wherein the tachometer function and/or timing advance adjustments are already provided.

What is claimed is:

1. An adaptor for monitoring the performance of diesel engines with instrumentation having an inductive-type pickup, comprising a transducer device to be coupled to the engine for monitoring the performance of a selected cylinder and producing an electrical signal in response thereto;

circuit means coupled to said transducer for processing said signal to derive a further signal in response to the occurrence of at least one characteristic of said transducer signal;

field generating means coupled to said circuit means and having an exterior contour for creating a concentrated magnetic field, said contour being engageable by the inductive pickup of said instrumentation, said field generating means being operable to create a change in field strength of sufficient magnitude to excite said inductive pickup upon occurrence of said further signal.

2. An adaptor according to claim 1 for monitoring the performance of diesel engines with inductive-type instrumentation in which said transducer is a piezoelectric device coupled to the fuel injection line for said selected cylinder and adapted to produce an electrical output signal upon the occurrence of injection into said line.

3. An adaptor according to claim 1 wherein said transducer is a nut-shaped device adapted to replace the coupling nut terminating the fuel line to the fuel pump of a diesel engine, whereby said transducer signal results from initiation of injection into the line from the pump.

4. An adaptor according to claim 1 wherein said transducer is a piezoelectric device adapted for coupling to the fuel injector nozzle of a selected cylinder and capable of producing an output signal representative of pressure changes within the selected cylinder.

5. An adaptor according to claim 1 wherein said transducer is a piezoelectric device adapted for substitution into a sparkplug or a glow-plug aperture of a selected engine cylinder and is capable of producing an output signal representative of pressure changes occurring within said selected cylinder.

6. An adaptor according to claim 1 wherein said field generating means is a torroidal coil having insulated electrical wire having a plurality of turns creating an electromagnetic field capable of exciting an inductive pickup clamped thereto.

7. An adaptor according to claim 1 wherein said field generating means is an electrical coil of insulated wires having multiple turns to create an electromagnetic field sufficient to energize that inductive pickup and wherein said coil is of a diameter having a cross-sectional thickness to allow engagement along at least a portion of the coil by a clamp-type inductive pickup.

8. An adaptor according to claim 1 further comprising a tachometer circuit and a readout driven by said circuit means for indicating engine RPM to the user.

9. An adaptor according to claim 1 further comprising a delay circuit means responsive to said circuit means and coupled to excite said field generating means at a predetermined instant subsequent to the occurrence of said transducer output signal.

* * * * *